March 15, 1960  B. J. FARROW  2,928,441
DOWEL-PIN HOLE-BORING JIG

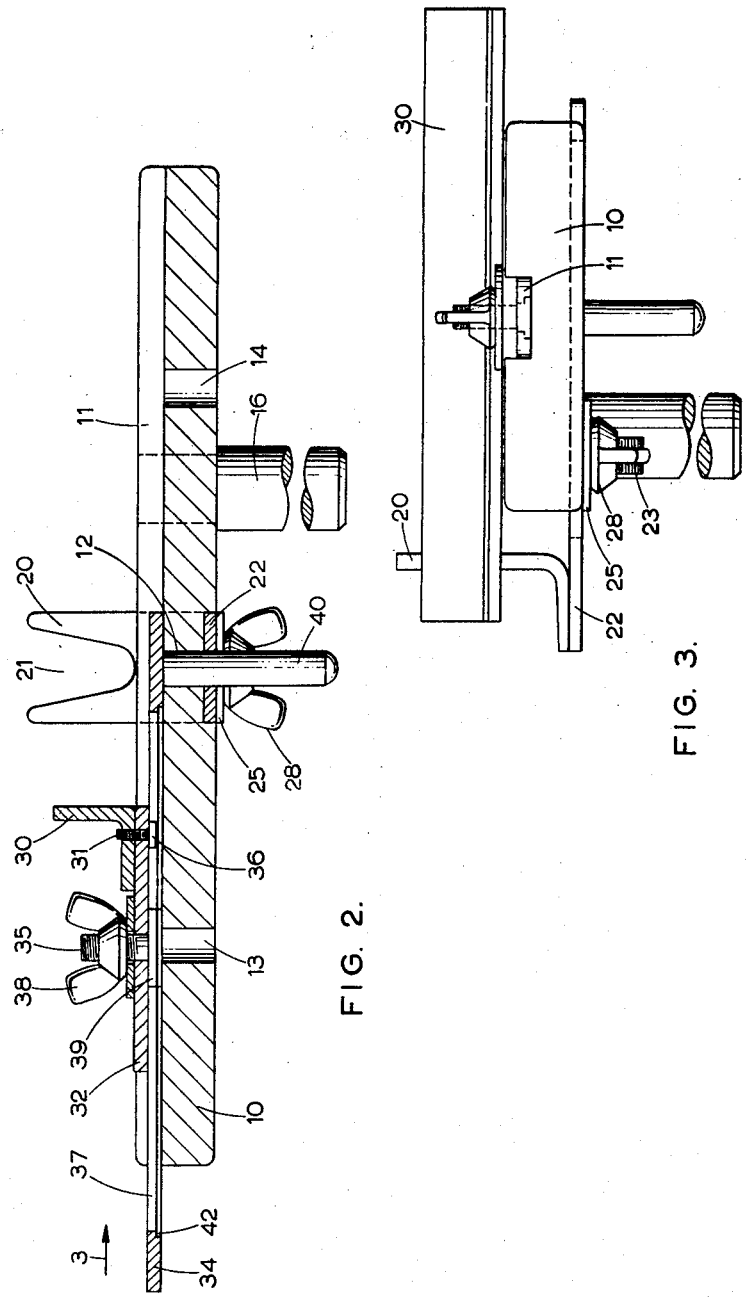

Filed April 7, 1958  4 Sheets-Sheet 3

BENJAMIN J. FARROW
INVENTOR
by Irwin S. Thompson
ATTORNEY

March 15, 1960   B. J. FARROW   2,928,441
DOWEL-PIN HOLE-BORING JIG
Filed April 7, 1958                                                   4 Sheets-Sheet 4

BENJAMIN J. FARROW
INVENTOR
by Irwin S. Thompson
ATTORNEY

United States Patent Office 2,928,441
Patented Mar. 15, 1960

2,928,441

DOWEL-PIN HOLE-BORING JIG

Benjamin J. Farrow, Wimborne, Dorset, England

Application April 7, 1958, Serial No. 726,711

Claims priority, application Great Britain April 18, 1957

4 Claims. (Cl. 144—253)

This invention relates to means for facilitating the jointing of pieces of wood or other material. An object of the invention is to enable joints to be made accurately and easily in place of mortice and tenon joints. A further object of the invention is to enable holes to be bored in separate pieces of wood or other material so that they can be joined by dowel pins.

Pieces of wood are commonly joined together by means of mortice and tenon joints or by "halving" but this takes a considerable time and requires a high degree of skill particularly for the amateur or the use of expensive machines. Another object of the present invention is to enable holes for dowelling to be bored accurately and quickly by means of a drill mounted in a lathe or other boring device or in a simple device of the kind known as "drill kits" which can be purchased cheaply.

According to the present invention a gauge device comprises a horizontal gauge table on which the work is to be placed, this table being adjustable vertically, a depth gauge mounted on the table, and a transverse stop in the form of a plate located above the table at right angles to the depth gauge and carried by a locating member to which it is attached by means permitting adjustment of the stop transversely of the cutting direction, said member being mounted on the table below the upper surface thereof by means of a vertical pin about which said stop can be rotated to either side of the tool whereby the work can be located the same distance from the axis of the cutting tool whether engaged against the stop on one side of the tool or the other, said locating member being disposed in and located by a locating groove in the table in either of its positions.

The invention will now be described more fully by way of example with reference to the accompanying diagrammatic drawings, wherein:

Figure 2 is a sectional view on the line 2—2 on Figure 1;

Figure 3 is an end elevation looking in the direction of the arrow 3 on Figure 2;

Figure 1:
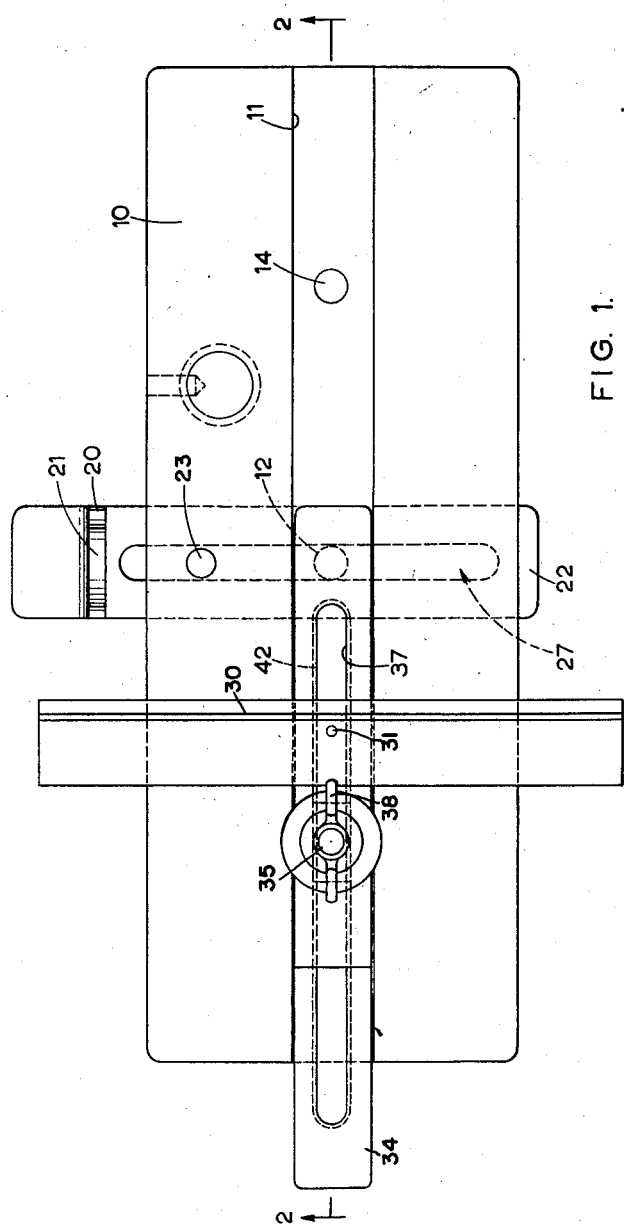
Figure 1 is a plan view of a gauge device made in accordance with the invention.

The device comprises a rectangular horizontal gauge table 10 having a locating groove 11 in its upper surface along its longitudinal median line, a vertical hole 12 at the crossing position of its longitudinal and transverse median lines, and two vertical holes 13, 14 spaced equidistantly from the hole 12 on opposite sides thereof on the longtiudinal median line. The table is fixed on a post 16 by which it can be mounted on a lathe or drilling machine with the axis of the hole 12 in the same vertical plane as the axis of the drill.

By means of this invention the pieces to be joined can be accurately positioned for boring while always maintaining the corresponding faces of the work in contact with the gauge table.

The depth gauge is a plate 20 provided with an opening 21 through which the boring tool passes. This plate is fixed on a bar 22 that is located in a groove in the underside of the table 10 at right angles to the groove 11 and held in adjustable position by means of a threaded stud 23 fixed to the table and which passes through a slot 27 in the bar 22, a wing nut 28 and a washer 25 on the stud 23. The depth gauge is thus adjustable along the boring tool to provide an adjustable limit to the depth of the hole to be bored.

A transverse stop or gauge plate 30 is fixed by a screw 31 to a plate 32 which is slidably located in the slot 11. The plate 32 is adjustably secured to a bar 34 by means of a bolt 35 that passes through a slot 37 in the bar 34 and through a hole in the plate 32 and carries a wing nut 38 for fixing the plate 32 in adjusted position along the bar 34 and therefore also to the boring tool. The bolt 35 has a rectangular head 39 serving as a guide plate and for this purpose slidably disposed in the slot 37. The slot 37 is undercut as at 42 to receive the plate 39. The screw 31 has a head 36 located in the slot 37 for holding the stop at right angles to the bar 34. The bar 34 has a vertical pin 40 fixed to it and engageable in any of the holes 12, 13, 14. The pin will normally be engaged in the hole 12. The transverse stop 30 (together with a parts to which it is attached) can be lifted to bring the bar 34 clear of the groove 11 and turned around the axis of the pin 40 until the bar has moved through 180°. The bar is then again dropped into the groove 11 on the other side of the hole 12, and the transverse stop is now exactly the same distance from the axis of the boring tool but on the opposite side. The pin 40 can be placed in the holes 13, 14 respectively for greater gauge distances whilst enabling the same gauge distance to be attained on opposite sides of the tool.

Figure 4:
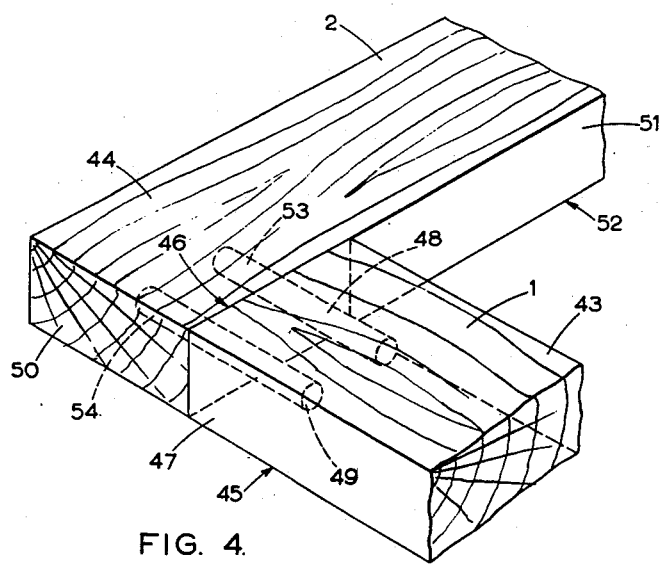
Figure 4 is a perspective view of one corner of a rectangular frame dowelled by means of the invention.
Figure 5:
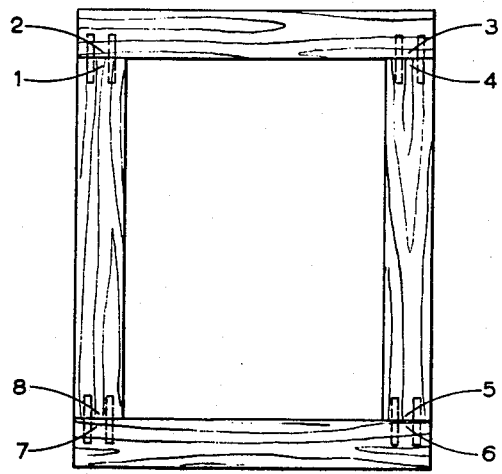
Figure 5 is a plan view of the whole frame.
Figure 6:
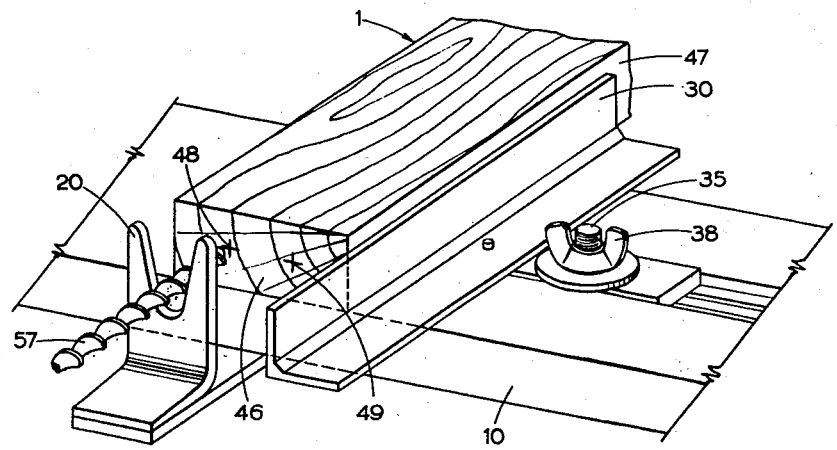
Figure 6 is a perspective view of part of the apparatus of the invention showing one of the members of the rectangular frame in position.
Figure 7:
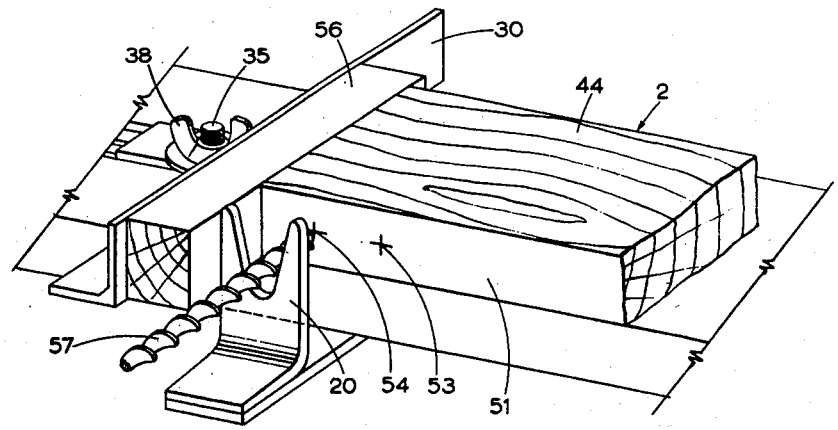
Figure 7 is a similar perspective view showing another frame member in position.

In cutting holes for jointing two pieces in a right angle part 1, 43 (Figure 4) is placed with its "face" side 45 on the gauge table, its end 46 against the boring tool 57 (see Figure 6) and its "face" edge 47 against the transverse stop now in its left hand position and adjusted relative to the boring tool so that the first 48 of two or more dowel holes 48, 49 is bored at the greatest distance from the transverse stop by pushing the work forwards until stopped by the depth stop. One or more distance pieces 56 (Figure 7) (a piece of waste of the same width as the distance required between the centres of the dowel holes) is now placed between the transverse stop and the work to position the latter in relation to the boring tool 57 for cutting the second or subsequent hole 48. Any number of dowel holes may be made by using a suitable number of distance pieces and removing one distance piece after each hole is bored. In order to bore the second part 44, the transverse stop is moved to its right hand position (see Figure 7) so that it can be engaged by the end 50 of the second part 44 which will align with the "face" edge 47 of the first part when assembled. The side 51 of the second part which is to be bored is placed against the boring tool and the "face" side 52 on the gauge table. The holes 53, 54 are then cut in the side of the part 2, the first 53 with the part against the transverse stop and then with the same distance piece 56 as before is inserted the second hole 54 is drilled. Thus both parts are drilled while their corresponding surfaces 45, 52 are on the gauge table 10 and 47, 50 against the transverse stop 30 ensuring accuracy which would be improbable if the second part were turned upside down during drilling as would be necessary if the transverse stop 30 remained on one side of the cutting axis. In jointing a rectangular frame the two members of each corner may be numbered consecutively from 1 to 8 (Figure 5). Ends or sides 1, 3, 5, 7 will be drilled with the transverse gauge 30 on one side of the table and ends or sides 2, 4, 6, 8 will be drilled with the transverse stop 30 on the other side.

Intermediate joints (that is, at a distance from and in addition to, the corner joints) can be made as follows:

Drill the end of the cross-member as defined. Remove the transverse stop 30. Mark the position of the first dowel hole in the long piece and improvise a stop at the required distance (say, a heavy object, a nail in a piece of wood, etc.). After boring the marked hole, insert distance pieces between end of piece and the improvised stop. While this cannot ensure exact positioning of the cross member, it will ensure that the respective holes are similarly spaced and the faces of the wood correspond.

I claim:

1. A gauge device for locating work in relation to a horizontal drill comprising a horizontal gauge table on which the work is to be placed, a depth gauge mounted on the table and upstanding therefrom and locatable in a plane at right angles to the axis of the drill, a transverse stop in the form of a plate located above the table in a plane at right angles to the plane of the depth gauge, a locating member mounted on the table below the upper surface thereof, said locating member being movable to either side of the drill and being disposed in and located by a locating groove in the table in either of its positions, said locating groove being parallel to the depth gauge, means attaching the transverse stop to the locating member in an adjustable manner permitting adjustment of the stop transversely of the axis of the drill, a vertical pin fixed to said locating member, said pin being located in a vertical hole in the gauge table and the axis of said vertical hole being in the same vertical plane as the axis of the drill and in the same vertical plane as the centre line of the locating groove, and about which pin said locating member and stop can be rotated to either side of the drill whereby the locating member can be placed in either of its two positions and the work can consequently be located against the transverse stop the same distance from the axis of the drill whether engaged against the stop on one side of the drill or the other.

2. A device as claimed in claim 1, wherein the locating device is a slotted bar elongated in the direction parallel to the plane of the depth gauge and having a slide device engaged in the slot and adjustable along it, said bar and slide device both being located in the said groove, said slide device carrying the transverse stop.

3. A device as claimed in claim 1 wherein the table has two additional vertical holes for the pin located equidistantly from the first hole on opposite sides thereof, the axis of all three holes being in a common vertical plane.

4. A device as claimed in claim 1 wherein the depth gauge is carried by a bar guided adjustably in a groove in the underside of the table transversely of the first groove.

References Cited in the file of this patent

UNITED STATES PATENTS

| | | |
|---|---|---|
| 284,850 | Hofstatter | Sept. 11, 1883 |
| 809,069 | Lovett | Jan. 2, 1906 |
| 1,667,022 | Wood | Apr. 24, 1928 |
| 2,260,784 | Morton | Oct. 28, 1941 |
| 2,712,839 | Harpell et al. | July 12, 1955 |

FOREIGN PATENTS

| | | |
|---|---|---|
| 611,599 | Great Britain | Nov. 1, 1948 |
| 882,760 | Germany | July 13, 1953 |